US008610777B2

(12) United States Patent
Bengtsson

(10) Patent No.: US 8,610,777 B2
(45) Date of Patent: Dec. 17, 2013

(54) COLOUR CALIBRATION CARD

(75) Inventor: Joakim Bengtsson, Malmo (SE)

(73) Assignee: QPCARD AB, Helsingborg (SE)

( * ) Notice: Subject to any disclaimer, the term of this patent is extended or adjusted under 35 U.S.C. 154(b) by 0 days.

(21) Appl. No.: 13/637,805

(22) PCT Filed: Mar. 30, 2011

(86) PCT No.: PCT/SE2011/050367
§ 371 (c)(1),
(2), (4) Date: Nov. 8, 2012

(87) PCT Pub. No.: WO2011/123043
PCT Pub. Date: Oct. 6, 2011

(65) Prior Publication Data
US 2013/0162840 A1 Jun. 27, 2013

(30) Foreign Application Priority Data

Mar. 31, 2010 (SE) ...................... 1000314

(51) Int. Cl.
H04N 17/02 (2006.01)
(52) U.S. Cl.
USPC .......................... 348/188; 348/187
(58) Field of Classification Search
USPC ................. 348/187, 188, 180–182; 702/85; 358/1.9; 345/589
IPC ........................... H04N 17/00,17/02
See application file for complete search history.

(56) References Cited

U.S. PATENT DOCUMENTS 5,764,386 A * 6/1998 Robinson ...................... 348/187
6,606,167 B1 * 8/2003 Rees et al. ..................... 358/1.9

FOREIGN PATENT DOCUMENTS

JP 2004236200 A 8/2004
WO 2004028144 A1 4/2004

OTHER PUBLICATIONS

ColorChecker, Image Reproduction Targets. Product brochure (online). X-Rite, 2006. URL:http://www.xrite.com/documents/literature/gmb/en/100_ColorChecker_brochure_en.pdf.

* cited by examiner

Primary Examiner — Sherrie Hsia
(74) Attorney, Agent, or Firm — Jeffrey S. Melcher; Manelli Selter PLLC

(57) ABSTRACT

A color calibration card (1) for digital photography with a maximum of 40 calibration fields, each exhibiting a color in a color space according to CIE 1976 (L*, a*, b*) D50 2°, wherein a first group with at least 3 calibration fields ($4_{G1}$, $4_{G2}$, $4_{G3}$) exhibits green colors having an a value within the range of −30 to −60 and a b value within the range of +10 to +30, a second group ($4_{B1}$, $4_{B2}$, $4_{B3}$) exhibits blue colors having an a value within the range of −20 to −20 and a b value within the range of −30 till −60, a third group ($4_{R1}$, $4_{R2}$, $4_{R3}$) exhibits red colors having an a value within the range of +40 to +60 and a b value within the range of −5 to +30, and wherein the respective calibration fields in each group ($4_{G1}$, $4_{G2}$, $4_{G3}$; $4_{B1}$, $4_{B2}$, $4_{B3}$; $4_{R1}$, $4_{R2}$, $4_{R3}$) exhibit colors for which the values in at least one of a or b differ by at least 5 units from the corresponding values for the other calibration fields in the group.

13 Claims, 4 Drawing Sheets

COLOUR CALIBRATION CARD

TECHNICAL FIELD

The present invention relates to a colour calibration card for digital photography.

BACKGROUND OF THE INVENTION

Various tools for colour calibration have been used for a long time in connection with traditional photography with light sensitive film. It is an advantage of such colour calibration tools that they facilitate the selection of film, the adjustment of camera and illumination, the selection of colour filters, if any, and the selection of development conditions and reproduction settings, so that the best possible end result can be achieved. So-called colour calibration cards, i.e. strips, sheets or cards of paper or other suitable material having pre-printed calibration fields of selected colour and grey tones, is one type of such previously known tools for colour calibration. By placing such a colour calibration card adjacent to the intended subject, information is thus obtained which facilitates the photography, developing and/or later reproduction, thereby providing a better end result. As a rule, these previously known colour calibration cards have calibration fields which are primary colours, which provide grey scales, which have been selected to resemble different colours in the nature, such as colours of sky, foliage, water, and the like, or which represent different skin tones. The previously known colour calibration cards for traditional photography are thus to a great extent based on the hues of the expected subjects of the photography.

Colour calibration cards which have been adapted specially for photography with digital camera, by adding additional calibration fields with skin tones and additional calibration fields providing a grey scale with smaller increments, have also been developed recently.

In a typical digital camera, there is a colour filter array, also called a colour filter mosaic, positioned in front of the pixel sensors of the camera's image sensor. The task of the colour filter array is to acquire colour information and it is necessary since the pixel sensors in general only can detect light intensity with little or no wavelength specificity. Thus, the pixel sensors cannot themselves separate colour information from the photographed subject. The colour filters in the colour filter array filter the light by wavelength range, so that the filtered intensities together provide information about the light colour. The most common type of colour filter array is so-called Bayer filters, which provide information about the light intensity in the red, green and blue wavelength regions. The raw data from the pixel sensors with overlying colour filter array can be converted to a full-colour image by using suitable algorithms.

When designing the previously known colour calibration cards no consideration has been given to the fact that the image sensor of a typical digital camera can only sense information about the light intensities in the red, green and blue wavelength regions and that the other colours are calculated based thereon. It has also been found that the colour filters for the respective three wavelength regions are not ideal in typical colour filter arrays, but asymmetrical, which results in a considerable transmittance also outside the transmittance peaks of the colour filters. Since the colours of the calibration fields on previously known colour calibration cards have primarily been selected to resemble the intended subjects, and without giving any consideration to the actual colour sensing system of a digital camera, a less reliable colour calibration result is achieved.

SUMMARY OF THE INVENTION

A first object of the invention is therefore to provide a colour calibration card where the colours of the calibration fields have been selected in a way which ensures a reliable colour calibration in connection with digital photography, and which consequently provides an improved end result of the digital photography.

This first object is achieved with a colour calibration card for digital photography, which comprises a printable substrate with a designated front side and a back side, wherein said front side exhibits a maximum of 40 calibration fields which each exhibit a colour in a colour space according to CIE 1976 (L*, a*, b*) D50 2°, and wherein a number of the calibration fields have been selected in such a way that said front side exhibits a first group with at least 3 calibration fields exhibiting respective green colours in said colour space having an a value within the range of −30 to −60 and a b value within the range of +10 to +30, a second group with at least 3 calibration fields exhibiting respective blue colours in said colour space having an a value within the range of −20 to +20 and a b value within the range of −30 till −60, a third group with at least 3 calibration fields exhibiting respective red colours in said colour space having an a value within the range of +40 to +60 and a b value within the range of −5 to +30, wherein the respective calibration fields in each group exhibit colours for which the values in at least one of the coordinates a or b differ by at least 5 units from the corresponding values for the other calibration fields in the same group, and whereby said three green, blue and red colours, respectively, of the calibration fields have been selected in the region where it is expected to find a digital camera's sensitivity peak to the respective colour, and with a defined interval between the respective calibration fields in each group, to provide an improved colour calibration result by means of said colour calibration card in digital photography.

Other objects, advantages and features of the present invention will be evident from the following description.

BRIEF DESCRIPTION OF DRAWINGS AND APPENDIX

In the following, a number of embodiments of the invention will be described more closely, merely as examples and with reference to the accompanying schematic drawings, in which:

FIG. 1 schematically illustrates the designated front side of a colour calibration card for digital photography according to a preferred embodiment of the invention;

DESCRIPTION OF EMBODIMENTS OF THE INVENTION

Figure 1:
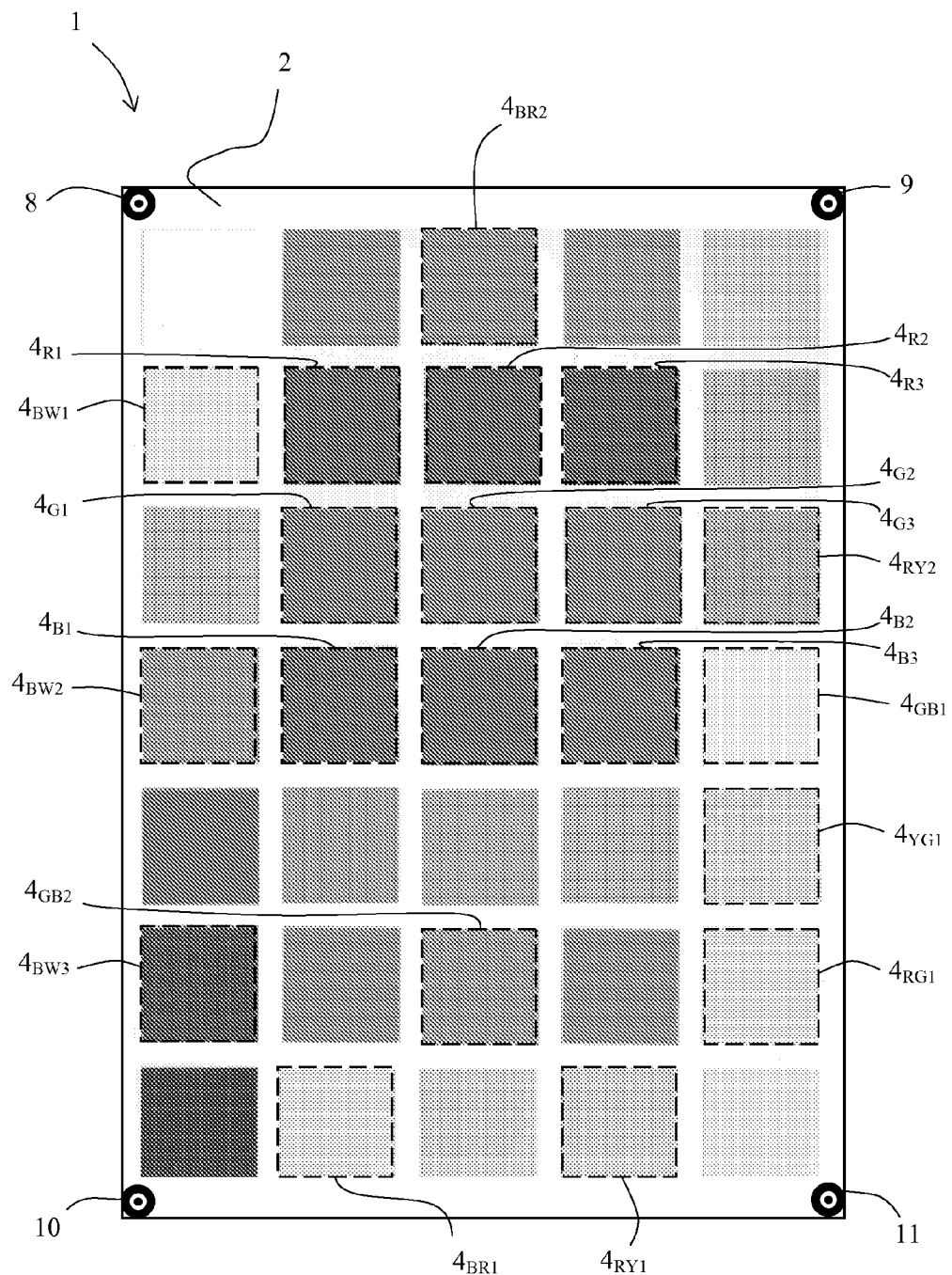

FIG. 1 is a schematic illustration of a colour calibration card for digital photography according to a preferred embodiment of the invention. The colour calibration card 1 comprises a printable substrate, such as paper, plastic-coated paper, plastic material, or the like. The colour calibration card has a designated front side 2, which is shown in FIG. 1, and a back side 3, shown in FIG. 2.

In the shown embodiment, the front side 2 of the calibration card exhibits 35 calibration fields, arranged in 7 rows and 5 columns. However, it is conceivable with embodiments of the invention where the colour calibration card exhibits up to a maximum of 40 calibration fields, which is sufficient for an adequate colour calibration by means of the colour calibration card according to the invention. It is also possible with embodiments of the invention where the colour calibration card has fewer than the 35 calibration fields being shown in FIG. 1.

Each of the calibration fields on the front side 2 of the colour calibration card exhibit a colour in a colour space according to CIE 1976 (L*, a*, b*) D50 2°, where all colours can be defined. According to the invention, a number of the calibration fields have been selected in a way that provides substantially improved colour calibration results in digital photography, namely so that a first group with at least 3 calibration fields $4_{G1}$, $4_{G2}$, $4_{G3}$ exhibits respective green colours in said colour space having an a value within the range of −30 to −60 and a b value within the range of +10 to +30, so that a second group with at least 3 calibration fields $4_{B1}$, $4_{B2}$, $4_{B3}$ exhibits respective blue colours in said colour space having an a value within the range of −20 to +20 and a b value within the range of −30 till −60, and so that a third group with at least 3 calibration fields $4_{R1}$, $4_{R2}$, $4_{R3}$ exhibits respective red colours in said colour space having an a value within the range of +40 to +60 and a b value within the range of −5 to +30, and wherein the respective calibration fields in each group $4_{G1}$, $4_{G2}$, $4_{G3}$; $4_{B1}$, $4_{B2}$, $4_{B3}$; $4_{R1}$, $4_{R2}$, $4_{R3}$ exhibit colours for which the values in at least one of the coordinates a or b differ by at least 5 units from the corresponding values for the other calibration fields in the same group. By thus selecting three green, blue and red colours, respectively, for the calibration fields in the region where it is expected to find a digital camera's sensitivity peak to the respective colour, and with a defined interval between the respective calibration fields in each group, the calibration result is improved most considerably by means of the colour calibration card according to the invention in comparison to previously known colour calibration cards where the colours have been selected based on the expected photography subjects.

Figure 2:
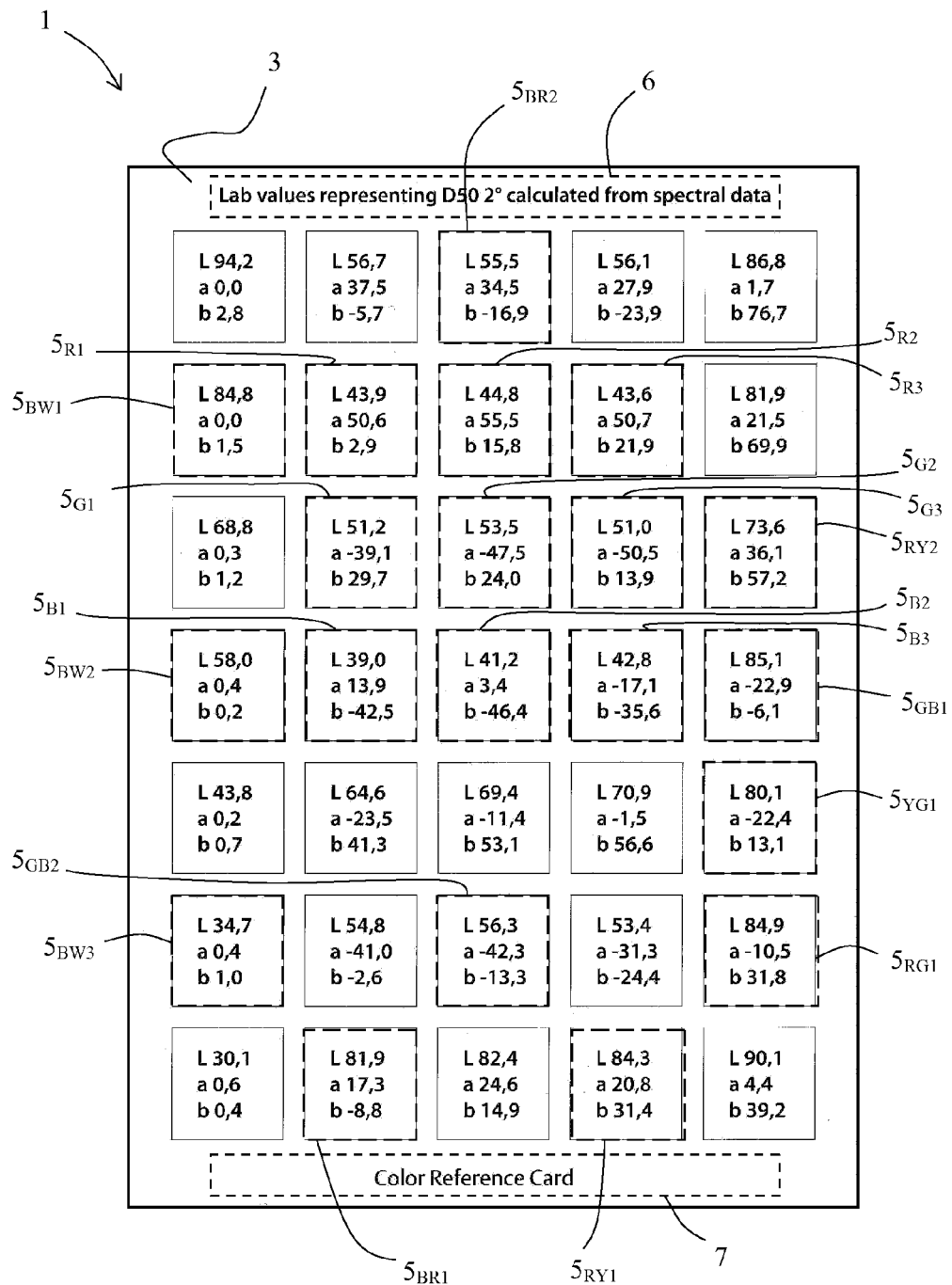
FIG. 2 is a schematic illustration of the back side of the colour calibration card of FIG. 1.

The reference designations $5_{G1}$, $5_{G2}$, $5_{G3}$ and $5_{B1}$, $5_{B2}$, $5_{B3}$ and $5_{R1}$, $5_{R2}$, $5_{R3}$ in FIG. 2 indicate data fields with "Lab values" according to CIE 1976 (L*, a*, b*) D50 2°, calculated from spectral data, for the three above-mentioned groups of colour calibration fields. This colour space is generally known in the field and was created to serve as a device-independent model for reference purposes. The "Lab values" in the data fields $5_{G1}$, $5_{G2}$, $5_{G3}$; $5_{B1}$, $5_{B2}$, $5_{B3}$; $5_{R1}$, $5_{R2}$, $5_{R3}$ in FIG. 2 thus define the respective colours of the calibration fields $4_{G1}$, $4_{G2}$, $4_{G3}$; $4_{B1}$, $4_{B2}$, $4_{B3}$; $4_{R1}$, $4_{R2}$, $4_{R3}$ on the front side of the colour calibration card in FIG. 1. In the present description and in the figures, only those calibration fields and data fields, respectively, which are mentioned directly in the description, or those data fields which are necessary for defining a corresponding calibration field mentioned in the description, have been provided with reference designations, wherein the number 4 refers to calibration fields and the number 5 refers to data fields.

Figure 3:
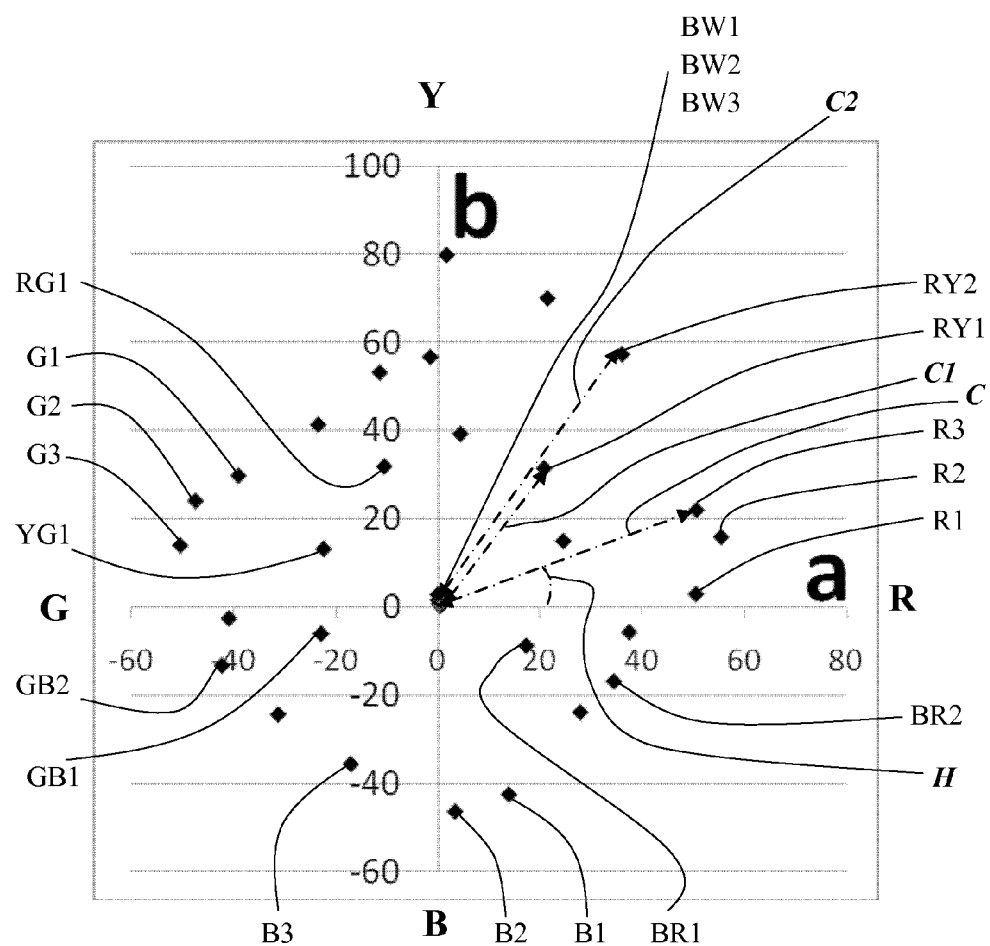
FIG. 3 shows the coordinates a and b in the a-b plane, in a colour space according to CIE 1976 (L*, a*, b*) D50 2°, for the respective colours of the calibration fields on the front side of the colour calibration card in FIG. 1.

FIG. 3 shows the coordinates a and b in the a-b plane for all colours of the calibration fields on the front side 2 of the colour calibration card according to the preferred embodiment in FIG. 1. The coordinates a, b have been taken from the respective data fields in FIG. 2. A number of points, in which colours mentioned specifically in the description position themselves in the a-b plane, have been indicated with the subscript in the reference designations of the calibration fields and of the corresponding data fields, respectively. Accordingly, the reference designation R3 in FIG. 3 indicates a red colour having the a and b coordinates in a colour space according to CIE 1976 (L*, a*, b*) D50 2° which are specified in the data field $5_{R3}$ in FIG. 2, and which exhibits the red colour which is illustrated schematically inside the calibration field $4_{R3}$ in FIG. 2. Like the other colours inserted in FIG. 3, the colour R3 has a colour saturation or chromaticity C, which can be defined as the distance from the origin in the a-b plane according to FIG. 3. Like the other colours inserted in FIG. 3, the colour R3 also has a colour tone or hue which, for example, can be defined as the angle H from the positive a-axis counter-clockwisely. The diagram in FIG. 3, where the colours of the calibration fields on the colour calibration card according to the preferred embodiment of the invention have been positioned in the a-b plane, can thus be compared to a colour circle with the quadrants R-Y (Red-Yellow), Y-G (Yellow-Green), G-B (Green-Blue) and B-R (Blue-Red).

In the preferred embodiment of the colour calibration card according to the invention, the colours of the calibration fields have been selected from the quadrants R-Y; Y-G; G-B; B-R in such a colour circle, as illustrated in FIG. 3, so that said plurality of calibration fields, from each quadrant, exhibits at least one first colour RY1; YG1; GB1; BR1 having a first colour saturation $C_1$, and at least one second colour RY2; G1; GB2; BR2 having a second colour saturation $C_2$, wherein the first colour saturation $C_1$ is no more than 60% of the second colour saturation $C_2$. Such a large difference in colour saturation between pairs of calibration fields with colours in the respective quadrants makes it easier to identify transmittance far away from the peaks in the colour filters of a digital camera.

In one advantageous embodiment of the colour calibration card according to the invention, said plurality of calibration fields comprises at least 2 calibration fields exhibiting colours from the intermediate colour groups Red/Green RG1, Blue/Red BR2, Green/Blue GB2. This embodiment provides an improved colour calibration for colours in the intermediate colour regions Red/Green, Blue/Red and Green/Blue, respectively, and is illustrated by the points RG1, BR2 and GB2, respectively, in FIG. 3, by the corresponding "Lab values" in the data fields $5_{RG1}$, $5_{BR2}$ and $5_{GB2}$, respectively, in FIG. 2, by the schematic representation of the colours of the corresponding colour fields $4_{RG1}$, $4_{BR2}$ and $4_{GB2}$, respectively, in FIG. 1, and by the encircled, approximate wavelength regions ~RG1, ~BR2 and ~GB2, respectively, in FIG. 4.

Figure 4:
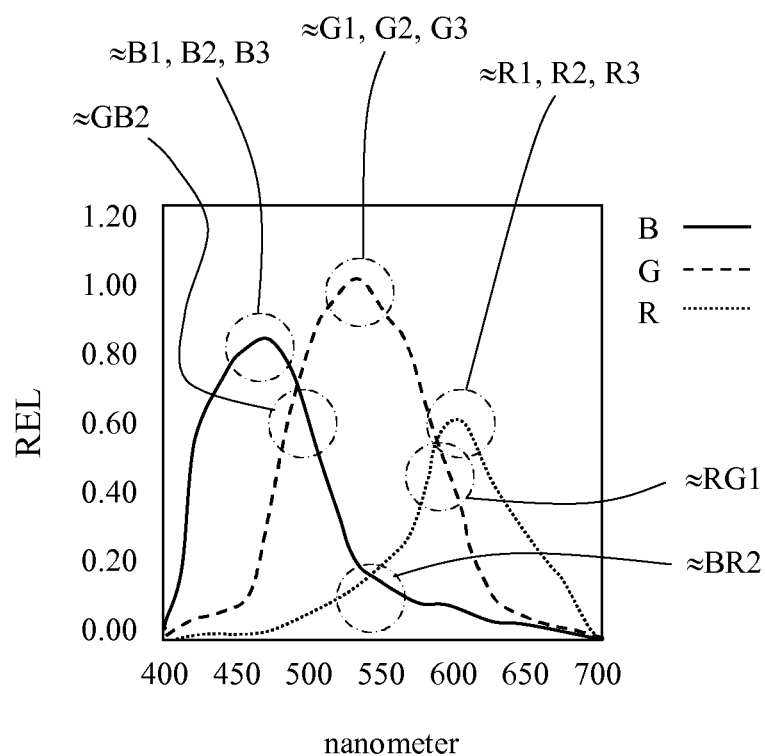
FIG. 4 is a schematic diagram of the relative spectral sensitivity to the colours blue, green and red, respectively, of the image sensor with overlying colour filter array in a typical digital camera; and Appendix 1 is a product sample of a colour calibration card according to the invention.

Moreover, FIG. 4 is a schematic diagram of the relative spectral sensitivity to the colours blue B, green G and red R, respectively, of the image sensor with overlying colour filter array in a typical digital camera. As is evident from the figure, the colour filters for the respective three colour regions of the camera's colour filter array are not ideal, but asymmetrical, which results in a considerable transmittance also outside the peaks of the colour filters. It has been found that also other digital cameras exhibit similar spectral sensitivity diagrams. Approximate wavelength regions ≈B1, B2, B3, ≈G1, G2, G3 and ≈R1, R2, R3, respectively, where the digital camera in question has maximum relative spectral sensitivity to the colours Blue, Green and Red, respectively, and to the intermediate colour regions Red/Green RG1, Blue/Red BR2, Green/Blue GB2, have also been indicated in FIG. 4.

In another advantageous embodiment, said plurality of calibration fields comprises at least 3 calibration fields exhibiting colours from the intermediate colour group Red/Green. This embodiment provides a further improved colour calibration for colours in the intermediate colour region Red/Green.

In the preferred embodiment of the colour calibration card according to the invention, said plurality of calibration fields comprises at least 3 calibration fields $4_{BW1}$, $4_{BW2}$, $4_{BW3}$ (see FIG. 1) providing a grey scale, wherein this embodiment is also illustrated by the corresponding "Lab values" in the data fields $5_{BW1}$, $5_{BW2}$ and $5_{BW3}$, respectively, in FIG. 2.

Preferably, as shown in FIG. 2, the colour calibration card according to the preferred embodiment of the invention exhibits a plurality of data fields $5_{R3}$, $5_{GB1}$, $5_{RG1}$ for "Lab values" according to CIE 1976 (L*, a*, b*) D50 2° corresponding to the respective colours R3, GB1, RG1 (see FIG. 3) of said calibration fields $4_{R3}$, $4_{GB1}$, $4_{RG1}$ (see FIG. 1). These data fields are preferably provided on a different surface of the calibration card than the designated front side, most advantageously on the back side 3, as is shown in FIG. 3. However, it is also conceivable with embodiments of the colour calibration card where the data fields are arranged on the same side as the calibration fields, or on a different side than the back side in cases where the colour calibration card is provided in the form of a folded leaflet.

In one advantageous embodiment of the invention, as is shown in FIG. 2, the colour calibration card exhibits at least one information field 6, 7 for text or other information, for example product name, article number, an address field, a specification of content in data fields, instructions for use, etc.

In the preferred embodiment of the invention, the front side 2 of the colour calibration card exhibits corner markings, preferably in the form of black and white circle patterns 8, 9, 10, 11, as is shown in FIG. 1, for facilitating adjustment of the camera before colour calibration. However, it is also conceivable with embodiments where such corner markings are also provided on a different side of the colour calibration card than the front side. The corner markings should be within the image and are used by the calibration application for automatically locating the position of the calibration fields, which is necessary for automatic measurement of RGB values for the photographed calibration fields.

The colour calibration card is particularly advantageously designed in an A4 format or smaller, in order to facilitate distribution, transport, handling and storage. Furthermore, in order to obtain a low cost of distribution, it is even more advantageous if the colour calibration card has a weight lower than 100 grams.

In the foregoing, a number of embodiments of the invention have been described with reference to the figures in the accompanying drawings. It must be understood that the described embodiments and the details in the figures should only be regarded as examples and that many other embodiments of the invention are possible within the scope of the following claims.

Appendix 1, which is filed together with the present patent application, is a product sample of a colour calibration card according to the present invention. The product sample is intended to better illustrate the colours which are mentioned in the text and illustrated schematically by grey scale in FIG. 1, by "Lab values" in the data fields in FIG. 2 and/or which are drawn in the a-b plane in FIG. 3.

The invention claimed is:

1. A color calibration card for digital photography, which comprises:
a printable substrate with a designated front side and a back side, wherein said front side exhibits a maximum of 40 calibration fields which each exhibit a color in a color space according to CIE 1976 (L*, a*, b*) D50 2°, wherein a number of the calibration fields have been selected in such a way that said front side exhibits a first group with at least 3 calibration fields ($4_{G1}$, $4_{G2}$, $4_{G3}$) exhibiting respective green colors in said color space having an a value within the range of −30 to −60 and a b value within the range of +10 to +30,
a second group with at least 3 calibration fields ($4_{B1}$, $4_{B2}$, $4_{B3}$) exhibiting respective blue colors in said color space having an a value within the range of −20 to +20 and a b value within the range of −30 to −60,
a third group with at least 3 calibration fields ($4_{R1}$, $4_{R2}$, $4_{R3}$) exhibiting respective red colors in said color space having an a value within the range of +40 to +60 and a b value within the range of −5 to +30, and that the respective calibration fields in each group ($4_{G1}$, $4_{G2}$, $4_{G3}$; $4_{B1}$, $4_{B2}$, $4_{B3}$; $4_{r1}$, $4_{R2}$, $4_{R3}$) exhibit colors for which the values in at least one of the coordinates a or b differ by at least 5 units from the corresponding values for the other calibration fields in the same group, whereby said three green, blue and red colors, respectively, of the calibration fields have been selected in the region where it is expected to find a digital camera's sensitivity peak to the respective color, and with a defined interval between the respective calibration fields in each group, to provide an improved color calibration result by means of said color calibration card in digital photography.

2. The color calibration card according to claim 1, wherein the colors of the calibration fields have been selected from the quadrants (R-Y; Y-G; G-B; B-R) in a color circle, so that said plurality of calibration fields, from each quadrant, exhibits at least one first color (RY1; YG1; GB1; BR1) having a first color saturation ($C_1$), and at least one second color (RY2; G1; GB2; BR2) having a second color saturation ($C_2$), wherein the first color saturation ($C_1$) is no more than 60% of the second color saturation ($C_2$).

3. The color calibration card according to claim 1, wherein said plurality of calibration fields comprises at least 2 calibration fields ($4_{YG1}$; $4_{BR2}$; $4_{GB2}$) exhibiting colors from the intermediate color groups Red/Green (RG1), Blue/Red (BR2), Green/Blue (GB2).

4. The color calibration card according to claim 1, wherein said plurality of calibration fields comprises at least 3 calibration fields exhibiting colors from the intermediate color group Red/Green.

5. The color calibration card according to claim 1, wherein said plurality of calibration fields comprises at least 3 calibration fields ($4_{Bw1}$, $4_{BW2}$, $4_{BW3}$) providing a grey scale.

6. The color calibration card according to claim 1, wherein the color calibration card also exhibits a plurality of data fields ($5_{R3}$, $5_{GB1}$, $5_{RG1}$) for "Lab values" according to CIE 1976 (L*, a*, b*) D50 2°, corresponding to the respective colors (R3, GB1, RG1) of said calibration fields ($4_{R3}$, $4_{GR1}$, $4_{RG1}$).

7. The color calibration card according to claim 6, wherein said data fields are provided on a different surface of the calibration card than the designated front side.

8. The color calibration card according to claim 6, wherein said data fields are provided on a back side of the calibration card.

9. The color calibration card according to claim 1, wherein the color calibration card exhibits at least one information field for text or other information.

10. The color calibration card according to claim 1, wherein the front side of the color calibration card exhibits corner markings for facilitating adjustment of the camera before color calibration.

11. The color calibration card according to claim 1, wherein the front side of the color calibration card exhibits corner markings in the form of black and white circle patterns for facilitating adjustment of the camera before color calibration.

12. The color calibration card according to claim 1, wherein the color calibration card is designed in an A4 format or smaller.

13. The color calibration card according to claim 1, wherein the color calibration card has a weight lower than 100 grams.

\* \* \* \* \*